United States Patent [19]

Mueller et al.

[11] Patent Number: 5,773,537
[45] Date of Patent: Jun. 30, 1998

[54] ZIEGLER-NATTA CATALYST SYSTEMS CONTAINING SPECIFIC ORGANOSILICON COMPOUNDS

[75] Inventors: Patrik Mueller, Kaiserslautern; Klaus-Dieter Hungenberg, Birkenau; Juergen Kerth, Carlsberg; Ralf Zolk, Weisenheim, all of Germany

[73] Assignee: BASF Aktiengesellschaft, Ludwigshafen, Germany

[21] Appl. No.: 579,890

[22] Filed: Dec. 28, 1995

Related U.S. Application Data

[63] Continuation-in-part of Ser. No. 516,962, Aug. 18, 1995, abandoned, which is a continuation of Ser. No. 335,827, Nov. 16, 1994, abandoned.

[30] Foreign Application Priority Data

May 19, 1992 [DE] Germany ............ 42 16 548.2

[51] Int. Cl.⁶ .................. B01J 31/00; B01J 37/00; C08F 4/02; C08F 4/60
[52] U.S. Cl. .................. 526/125.3; 526/128; 502/115; 502/116; 502/120; 502/125; 502/126; 502/127
[58] Field of Search .................. 502/113, 115, 502/116, 120, 125, 127, 126; 526/128, 125.3

[56] References Cited

U.S. PATENT DOCUMENTS

| | | | |
|---|---|---|---|
| 4,780,443 | 10/1988 | Matsuura et al. | 502/126 |
| 4,857,613 | 8/1989 | Zolk et al. | 502/125 |
| 4,952,649 | 8/1990 | Kioka et al. | 502/119 |
| 4,999,327 | 3/1991 | Kao et al. | 502/120 |
| 5,028,671 | 7/1991 | Kioka et al. | 502/116 |
| 5,075,396 | 12/1991 | Kashiwa et al. | 502/116 |
| 5,162,465 | 11/1992 | Kerth et al. | 526/351 |
| 5,177,043 | 1/1993 | Koyama et al. | 502/125 |
| 5,194,531 | 3/1993 | Toda et al. | 526/128 |
| 5,229,476 | 7/1993 | Hara et al. | 502/119 |
| 5,244,989 | 9/1993 | Hara et al. | 502/113 |
| 5,288,824 | 2/1994 | Kerth et al. | 526/351 |
| 5,336,652 | 8/1994 | Mink et al. | 502/120 |
| 5,489,634 | 2/1996 | Hara et al. | 502/116 |
| 5,506,183 | 4/1996 | Sano et al. | 502/127 |
| 5,604,171 | 2/1997 | Collette et al. | 502/120 |
| 5,608,018 | 3/1997 | Ebara et al. | 502/115 |
| 5,658,840 | 8/1997 | Kolle et al. | 502/126 |

FOREIGN PATENT DOCUMENTS

| | | | |
|---|---|---|---|
| 0 014 523 | 8/1980 | European Pat. Off. . | |
| 0 023 425 | 2/1981 | European Pat. Off. . | |
| 0 045 975 | 2/1982 | European Pat. Off. . | |
| 0 045 977 | 2/1982 | European Pat. Off. . | |
| 0 086 473 | 8/1983 | European Pat. Off. . | |
| 0 171 200 | 2/1986 | European Pat. Off. . | |
| 0 195 497 | 9/1986 | European Pat. Off. . | |
| 0 250 229 | 12/1987 | European Pat. Off. . | |
| 0 261 961 | 3/1988 | European Pat. Off. . | |
| 0 282 341 | 9/1988 | European Pat. Off. . | |
| 0 288 845 | 11/1988 | European Pat. Off. . | |
| 0 445 302 | 9/1991 | European Pat. Off. . | |
| 0 530 814 | 3/1993 | European Pat. Off. . | |
| 3-33102 | 2/1991 | Japan | 526/128 |
| 3-33103 | 2/1991 | Japan | 526/128 |
| 3-33104 | 2/1991 | Japan | 526/128 |
| 3-33105 | 2/1991 | Japan | 526/128 |
| 3-33106 | 2/1991 | Japan | 526/128 |

*Primary Examiner*—Glenn Caldarola
*Assistant Examiner*—J. Pasterczyk
*Attorney, Agent, or Firm*—Keil & Weinkauf

[57] ABSTRACT

Catalyst systems of the Ziegler-Natta type contain, as active components a) a titanium-containing solid component in whose preparation a titanium compound, a compound of magnesium, a halogenating agent and an electron donor component are used,
b) an aluminum compound and
c) as a further electron donor component, an organosilicon compound of the formula (I)

$$R^1R^2Si(OR^3)_2 \qquad (I)$$

where $R^1$ is $C^1$-$C_{10}$-alkyl or $C_3$-$C_8$-cycloalkyl, excluding sec-butyl, $R^2$ is sec-butyl and $R^3$ is $C_1$-$C_8$-alkyl. The catalyst systems are particularly suitable for the preparation of polymers of $C_2$-$C_{10}$-alk-1-enes.

5 Claims, No Drawings

5,773,537

ZIEGLER-NATTA CATALYST SYSTEMS CONTAINING SPECIFIC ORGANOSILICON COMPOUNDS

This application is a continuation-in-part of application Ser. No. 08/516,962, filed on Aug. 18, 1995, which is a continuation of Ser. No. 08/335,827, filed Nov. 16, 1994.

BACKGROUND OF THE INVENTION

Field of the Invention

The present invention relates to novel catalyst systems of the Ziegler-Natta type containing, as active components,
a) a titanium-containing solid component in whose preparation a titanium compound, a compound of magnesium, a halogenating agent and an electron donor component are used,
b) an aluminum compound and
c) as a further electron donor component, an organo-silicon compound of the formula (I)

$$R^1R^2Si(OR^3)_2 \quad (I)$$

where $R^1$ is $C_1$-$C_{10}$-alkyl or $C_3$-$C_8$-cycloalkyl, excluding isopropyl, sec-butyl and tert-butyl, $R^2$ is sec-butyl and $R^3$ is $C_1$-$C_8$-alkyl.

The present invention furthermore relates to the preparation of polymers of $C_2$-$C_{10}$-alk-1-enes with the aid of these catalyst systems, the polymers obtainable hereby and films and moldings of these polymers.

DESCRIPTION OF THE RELATED ART

Catalyst systems of the Ziegler-Natta type are disclosed in, inter alia, EP-B 14523, EP-A-23425, EP-A 45 975, EP-A 195 497, EP-A 250 229 and U.S. Pat. No. 4,857,613. These systems are used in particular for polymerizing alk-1-enes and contain, inter alia, compounds of poly-valent titanium, aluminum halides and/or alkylaluminums, as well as electron donor compounds, for example silicon compounds, ethers, carboxylates, ketones and lactones, which are used on the one hand in conjunction with the titanium compound and on the other hand as a cocatalyst.

To ensure economical polyalk-1-ene production, such catalyst systems must have, inter alia, a high productivity. This is understood as being the ratio of the amount of polymer formed to the amount of catalyst used. It is also necessary for the polymers obtainable to be highly stereospecific, i.e. the amount of noniso-tactic molecular structures in the homopolymers should not exceed from 2.0 to 3.0%.

These two aims together can be realized only to a limited extent by the prior art. For example, EP-A 86 473 discloses a catalyst system in which carboxylates are used as the electron donor compounds within the titanium-containing solid component and in general organic silicon compounds are used as further electron donor compounds and which has satisfactorily high productivity but is unsatisfactory with regard to the stereospecificity of the resulting polymers. Furthermore, EP-A-171 200 describes a Ziegler-Natta catalyst system which has, inter alia, carboxylates as constituents of the titanium-containing solid component and in general organic silicon compounds as further electron donor compounds. These catalyst systems permit, inter alia, the preparation of polypropylene having high stereospecificity but do not have the satisfactorily high productivity.

In addition to these properties which are particularly important for the processing of the polymers, a low halogen content of the polyalk-1-ene is also of importance in order to permit such materials to be used in conjunction with materials susceptible to corrosion. For this purpose, it is necessary in particular substantially to reduce the halogen content of the polymer. Furthermore, for process engineering reasons it is important for the polyalk-1-enes to have good morphological properties, in particular a very small fraction of very small particles.

It is an object of the present invention to provide an improved catalyst system with which the disdvantages described can be substantially remedied and which makes it possible to prepare polymers of $C_2$-$C_{10}$-alk-1-enes with high productivity, which polymers possess high stereospecificity, good morphological properties and a very low halogen content.

SUMMARY OF THE INVENTION

We have found that this object is achieved by the novel catalyst systems stated in the claims.

For the preparation of the titanium-containing solid component a), in general halides or alkoxides of trivalent or tetravalent titanium are used as the titanium compounds, the chlorides of titanium, in particular titanium tetrachloride, being preferred. Advantageously, the titanium-containing solid component contains a finely divided carrier, silicas and aluminas as well as aluminum silicates of the empirical formula $SiO_2 \cdot aAl_2O_3$, where a is from 0.001 to 2, in particular from 0.01 to 0.5, having proven useful for this purpose.

DESCRIPTION OF THE PREFERRED EMBODIMENTS

The preferably used carriers have a particle diameter of from 0.1 to 1000 µm, in particular from 10 to 300 µm, a pore volume of from 0.1 to 10, in particular from 1.0 to 5.0, cm³/g and a specific surface area of from 10 to 1,000, in particular from 100 to 500, m²/g.

Furthermore, compounds of magnesium, inter alia, are used in the preparation of the titanium-containing solid component a). Suitable compounds of this type are magnesium halides, magnesium aryls, magnesium alkyls and alkoxymagnesium and aryloxymagnesium compounds, magnesium dichloride, magnesium dibromide and di-$C_1$-$C_{10}$-alkyl-magnesium compounds being particularly used. A halogenating agent, preferably chlorine, hydrogen chloride, bromine or hydrogen bromide, is also used in the preparation of this component.

In addition to the trivalent or tetravalent titanium compounds and, if required, the carrier, the magnesium compound and the halogenating agent, electron donor components, for example mono- or polyfunctional carboxylic acids, carboxylic anhydrides, carboxylates, ketones, ethers, alcohols, lactones and organophosphorus and organosilicon compounds, are also used in the preparation of the titanium-containing solid component a).

Preferred electron donor components within the titanium-containing solid component a) are, inter alia, diesters of 3- or 4-membered, unsubstituted or substituted cycloalkyl-1,2-dicarboxylic acids and monoesters of unsubstituted or substituted benzophenone-2-carboxylic acids. The alcohols conventionally used in esterification reactions, including $C_1$-$C_{15}$-alcohols, $C_5$-$C_7$-cyclo-alcohol, which in turn may carry $C_1$-$C_{10}$-alkyl groups, and $C_6$-$C_{10}$-phenols, are employed as hydroxy compounds for these esters.

Further preferably used electron donor components within the titanium-containing solid component include phthalic acid derivatives of the formula II

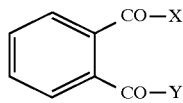 (II)

where X and Y are each chlorine or $C_1$-$C_{10}$-alkoxy, in particular $C_1$-$C_4$-alkoxy, or together form oxygen.

The titanium-containing solid component can be prepared by conventional methods. Examples of these are described in, inter alia, EP-A 45 975, EP-A 45 977, EP-A 86 473, EP-A 171 200, GB-A 2 111 066 and U.S. Pat. No. 4,857,613.

In the preparation of the titanium-containing solid component a), the following three-stage process is preferably used.

In the first stage, a solution of a magnesium-containing compound in a liquid alkane is first added to a finely divided carrier, preferably silica or $SiO_2 \cdot aAl_2O_3$, where a is from 0.001 to 2, in particular from 0.01 to 0.5, after which this mixture is stirred for from 0.5 to 5 hours at from 10° to 120° C. From 0.1 to 1 mol of the magnesium compound is preferably used per mol of the carrier. A halogen or a hydrogen halide, in particular chlorine or hydrogen chloride, is then added, with constant stirring, in at least a two-fold, preferably at least a five-fold, molar excess, based on the magnesium-containing compound.

A $C_1$-$C_8$-alcohol, in particular ethanol, a halide or an alkoxide of trivalent or tetravalent titanium, in particular titanium tetrachloride, and an electron donor compound, in particular a phthalic acid derivative of the general formula (II), are then added. From 1 to 5, in particular from 2 to 4, mol of alcohol, from 2 to 20, in particular from 4 to 10, mol of the trivalent or tetravalent titanium and from 0.01 to 1, in particular from 0.1 to 1.0, mol of the electron donor compound are used per mol of magnesium of the solid obtained in the first stage. The solution is stirred at from 10° to 150° C. and the solid substance thus obtained is then filtered off and is washed with a liquid alkane, preferably with hexane or heptane.

Suitable aluminum components b), in addition to trialkylaluminum compounds whose substituents are each of 1 to 8 carbon atoms, are compounds in which one alkyl substituent is replaced with alkoxy or halogen, for example chlorine or bromine. Trialkylaluminum compounds whose alkyl groups are each from 1 to 8 carbon atoms, for example trimethyl-, triethyl- or methyldiethylaluminum, are preferably used.

According to the invention, an organosilicon compound of the general formula (I)

$$R^1R^2Si(OR^3)_2 \quad (I)$$

where $R^1$ is $C_1$-$C_{10}$-alkyl or $C_3$-$C_8$-cycloalkyl, excluding isopropyl, sec-butyl and tert-butyl, $R^2$ is sec-butyl and $R^3$ is $C_1$-$C_8$-alkyl, is used as the further electron donor component c).

Preferably used organosilicon compounds of the formula (I) are those in which $R^1$ is branched $C_3$-$C_8$-alkyl, in particular branched $C_3$-$C_6$-alkyl, and $R^3$ is $C_1$-$C_6$-alkyl, in particular $C_1$-$C_4$-alkyl. Particularly preferred organosilicon compounds are those in which $R^1$ is isobutyl or isopropyl.

Among these compounds, dimethoxyisobutyl-sec-butylsilane, diethoxyisobutyl-sec-butylsilane, diisopropoxyisobutyl-sec-butylsilane, diisobutoxyisobutyl-sec-butylsilane, dimethoxyisopropyl-sec-butylsilane and diethoxyisopropyl-sec-butylsilane are particularly noteworthy.

Preferably used catalyst systems are those in which the atomic ratio of aluminum from the aluminum compound b) to titanium from the titanium-containing solid component a) is from 10:1 to 800:1, in particular from 20:1 to 200:1, and the molar ratio of the aluminum compound b) to the electron donor compound c) used according to the invention is from 1:1 to 100:1, in particular from 2:1 to 80:1. The catalyst components may be introduced into the polymerization system individually in any order or as a mixture of the components.

The novel catalyst system is particularly suitable for polymerizing $C_2$-$C_{10}$-alk-1-enes. $C_2$-$C_{10}$-alk-1-enes in this context are understood as being in particular ethylene, propylene, but-1-ene, pent-1-ene, hex-1-ene, hept-1-ene or oct-1-ene or mixtures of these $C_2$-$C_{10}$-alk-1-enes, preferably used monomers being propylene or but-1-ene. The novel catalyst system is particularly suitable for the homopolymerization of propylene or the copolymerization of propylene with minor amounts of ethylene, but-1-ene, pent-1-ene, hex-1-ene or mixtures of these monomers.

The preparation of polymers of $C_2$-$C_{10}$-alk-1-enes with the aid of the novel catalyst system can be carried out in the conventional reactors used for polymerizing propylene, either batchwise or, preferably, continuously, inter alia as a suspension polymerization or, preferably, as a gas-phase polymerization. Suitable reactors include continuously operated stirred reactors which contain a fixed bed of finely divided polymer which is usually kept in motion by suitable stirring apparatuses. Of course, the reaction may also be carried out in a number of reactors connected in series.

The polymerization reaction is advantageously carried out at from 20° to 150° C., preferably from 40° to 100° C., and from 1 to 100, preferably from 10 to 50, bar. The average residence times of the reaction mixture during the polymerization with the aid of the novel catalyst system are usually from 1 to 10, in particular from 1 to 5, hours. The molecular weight of the polyalk-1-enes formed can be regulated by adding regulators conventionally used in polymerization technology, for example hydrogen. It is also possible for inert solvents, for example toluene or hexane, or inert gases, such as nitrogen or argon, to be present.

The average molecular weights of the polymers prepared with the aid of the novel catalyst system are from 10,000 to 1,000,000 and the melt flow indices are from 0.1 to 100, preferably from 0.2 to 50, g/10 min, measured in each case according to DIN 53,735 at 230° C. and 2.16 kg. The melt flow index corresponds to the amount of polymer which is forced, in the course of 10 minutes at 230° C. and under a weight of 2.16 kg, out of the test apparatus standardized according to DIN 53,735.

The novel catalyst system has high productivity, particularly in gas-phase polymerizations. The polymers obtainable in this manner have high stereospecificity, a low chlorine content and a very small fraction of very fine particles (<0.25 mm). The polymers prepared using this catalyst system are suitable in particular for the production of films and moldings.

EXAMPLES

Example 1 a) Preparation of the titanium-containing solid component (1)

In a first stage, a solution of n-butyloctyl-magnesium in n-heptane was added to $SiO_2$ which had a particle diameter of from 20 to 45 µm, a pore volume of 1.7 cm$^3$/g and a specific surface area of 330 m$^2$/g, 0.3 mol of the magnesium compound being used per mol of $SiO_2$. The solution was stirred for 30 minutes at 40° C. and then cooled to 20° C., after which 10 times the molar amount, based on the organomagnesium compound, of hydrogen chloride was passed in. After 60 minutes;3 mol of ethanol per mol of magnesium were added to the reaction product with constant stirring. This mixture was stirred for 30 minutes at 80°C., after which 7.2 mol of titanium tetrachloride and 0.5 mol of di-n-butyl phthalate dissolved in ethylbenzene were added, the amounts each being based on 1 mol of magnesium. Stirring was then carried out for 1 hour at 100° C. and the solid substance thus obtained was filtered off and washed several times with ethylbenzene.

The solid product obtained therefrom was extracted for 3 hours at 125° C. with a 10% strength by volume solution of titanium tetrachloride in ethylbenzene. Thereafter, the solid product was isolated from the extracting agent by filtration and was washed with n-heptane until the extracting agent contained only 0.3% by weight of titanium tetrachloride.

The titanium-containing solid component contained 3.6% by weight of Ti, 7.7% by weight of Mg and 27.9% by weight of Cl.

b) Polymerization 50 g of polypropylene powder (melt flow index: 10 g/10 min at 230° C. and 2.16 kg, according to DIN 53,735), 10 mmol of triethylaluminum (in the form of a 1 molar solution in n-heptane), 10 l of hydrogen, 93.2 mg of the titanium-containing solid component prepared according to Example 1a) and 1 mmol of dimethoxyisobutyl-sec-butylsilane were initially taken at 30° C. in a 10 l steel autoclave provided with a stirrer. The molar ratio of the aluminum component to the organosilicon compound used according to the invention was 10:1. Thereafter, the reactor temperature was increased to 70° C. in the course of 10 minutes and the reactor pressure was brought to 28 bar by forcing in gaseous propylene, after which polymerization was carried out with an average residence time of the reaction mixture of 1.5 hours. The monomer consumed was continuously replaced with fresh monomer.

1,430 g of a propylene homopolymer having a melt flow index of 11.3 g/10 min at 230° C. and 2.16 kg (according to DIN 53,735) were obtained. The productivity of the catalyst system, which is defined as the ratio of the amount of polymer formed to the amount of titanium-containing solid component, the heptane-soluble fraction, which is a measure of the proportion of noniso-tactic structural units, the fraction of very fine particles (<0.25 mm) and the chlorine content of the polymer are listed in the Table below.

Example 2

Propylene was polymerized using the same catalyst system and under the reaction conditions as described in Example 1, the reaction being carried out in a suspension at 37 bar and 80° C. instead of 28 bar and 70° C.

Example 3

Propylene was polymerized using the same catalyst system and under the reaction conditions as described in Example 1, 1 mmol of dimethoxyisopropyl-sec-butylsilane being used instead of 1 mmol of dimethoxyisobutyl-sec-butylsilane, as the further electron donor component c).

1,435 g of a propylene homopolymer having a melt flow index of 12.8 g/10 min at 230° C. and 2.16 kg (according to DIN 53,735) were obtained. The further results are shown in the Table below.

TABLE

|  | Example 1 | Example 2 | Example 3 |
|---|---|---|---|
| Productivity (g of propylene/g of titanium-containing solid component) | 15,340 | 20,200 | 15,400 |
| Heptane-soluble fractions (% by weight) | 2.2 | 1.7 | 2.1 |
| Fraction of very fine particles <0.25 mm (in %) | 1.0 | 0.5 | 0.8 |
| Chlorine content of the polymer (ppm) | 18 | 14 | 18 |

We claim:

1. A Ziegler-Natta catalyst composition, comprising
   a) a titanium-containing solid component, said component being prepared from a titanium compound, a compound of magnesium, a halogenating agent and an electron donor component,
   b) an aluminum compound and
   c) as a further electron donor component dimethoxyisobutyl-secbutylsilane.

2. A catalyst composition as defined in claim 1, wherein the titanium-containing solid component a) contains a carrier.

3. A catalyst composition as defined in claim 1, wherein a phthalic acid of the formula (II)

where X and Y are the same oxygen atom forming an anhydride or X and Y are each chlorine or $C_1$-$C_{10}$-alkoxy, is used as the electron donor component of the titanium-containing solid component a).

4. A catalyst composition as defined in claim 1, wherein a trialkylaluminum compound whose substituents are each of 1 to 8 carbon atoms is used as the aluminum compound b).

5. A process for the preparation of polymers of $C_2$-$C_{10}$-alk-1-enes which comprises polymerizing $C_2$-$C_{10}$-alk-1-enes at a temperature of from 20° to 150° C., a pressure of from 1 to 100 bar and for an average residence time of the reaction mixture of from 1 to 10 hours in the presence of a Ziegler-Natta catalyst composition comprising
   a) a titanium-containing solid component, said component being prepared from a titanium compound, a compound of magnesium, a halogenating-agent and an electron donor component,
   b) an aluminum compound and
   c) as a further electron donor component dimethoxyisobutyl-secbutylsilane.

* * * * *